(12) United States Patent
Hu et al.

(10) Patent No.: US 8,269,730 B2
(45) Date of Patent: Sep. 18, 2012

(54) WIRING STRUCTURES FOR PANELS

(75) Inventors: Hua-Chi Hu, Hsinchu Science Park (TW); Naejye Hwang, Hsinchu (TW)

(73) Assignee: Integrated Digital Technologies, Inc., Hsinchu (TW)

( * ) Notice: Subject to any disclaimer, the term of this patent is extended or adjusted under 35 U.S.C. 154(b) by 970 days.

(21) Appl. No.: 12/062,385

(22) Filed: Apr. 3, 2008

(65) Prior Publication Data

US 2009/0251395 A1    Oct. 8, 2009

(51) Int. Cl.
*G06F 3/041* (2006.01)
(52) U.S. Cl. ............... 345/173; 345/174; 178/18.01; 178/18.03; 178/18.06
(58) Field of Classification Search ............... 345/173
See application file for complete search history.

(56) References Cited

U.S. PATENT DOCUMENTS

| | | | |
|---|---|---|---|
| 6,222,528 B1 * | 4/2001 | Gerpheide et al. | 345/173 |
| 6,822,631 B1 * | 11/2004 | Yatabe | 345/89 |
| 2004/0150629 A1 * | 8/2004 | Lee | 345/173 |
| 2005/0078070 A1 * | 4/2005 | An | 345/87 |
| 2005/0200294 A1 | 9/2005 | Naugler, Jr. et al. | |
| 2006/0138333 A1 * | 6/2006 | Nascetti et al. | 250/370.09 |
| 2006/0262056 A1 * | 11/2006 | Masutani et al. | 345/87 |
| 2008/0006453 A1 * | 1/2008 | Hotelling | 178/18.06 |
| 2008/0158176 A1 * | 7/2008 | Land et al. | 345/173 |

FOREIGN PATENT DOCUMENTS

| | | |
|---|---|---|
| TW | 200421156 | 10/2004 |
| TW | 200703196 | 1/2007 |

OTHER PUBLICATIONS

Office Action for Taiwan Patent Application No. 097112254, from the Taiwan Patent Office, dated Oct. 5, 2010.

\* cited by examiner

*Primary Examiner* — Quan-Zhen Wang
*Assistant Examiner* — David Lee
(74) *Attorney, Agent, or Firm* — Finnegan, Henderson, Farabow, Garrett & Dunner, LLP

(57) ABSTRACT

A panel capable of detecting an input signal applied on or over the panel comprises an array of sensor elements divided into first $M_1$ groups arranged in rows and columns and second $M_1$ groups arranged in rows and columns, each group in one of the first and second $M_1$ groups including a number of M rows by N columns sensor elements, $M_1$, M and N being integers, wherein each of the sensor elements includes a first port and a second port, $M_1$ gate lines, wherein each of the $M_1$ gate lines is coupled to one group of the first $M_1$ groups and one group of the second $M_1$ groups, and wherein the each of the $M_1$ gate lines is coupled to the first port of each of the sensor elements in the one group of the first $M_1$ groups and the one group of the second $M_1$ groups, a first set of N fan-out lines, wherein each of the N fan-out lines is coupled to one column of the N columns of sensor elements in each of the groups at each of the columns of the first $M_1$ groups, and a second set of N fan-out lines, wherein each of the N fan-out lines is coupled to one column of the N columns of sensor elements in each of the groups at each of the columns of the second $M_1$ groups.

20 Claims, 6 Drawing Sheets

WIRING STRUCTURES FOR PANELS

BACKGROUND OF THE INVENTION

The present invention relates to panels. More particularly, the present invention relates to wiring structures for panels.

Conventional panels may detect a user's touching status or light difference on or over the panels so as to detect whether an input signal is present. Such a conventional panel may include a display element such as a liquid crystal panel (LCD) on which sensor elements may be formed. The sensor elements may be configured to sense the touching status or the light difference at corresponding positions on the panel. Moreover, a plurality of gate lines may be required to drive the sensor elements and a plurality of scan lines may be required to collect output signals generated by the sensor elements. With the increasing demand on large-size panels, the number of sensor elements and in turn the number of gate lines and scan lines may also increase. As a result, the area required for the wiring structure of the gate lines and scan lines on the panel may also increase, which may adversely affect the resolution of the panel.

BRIEF SUMMARY OF THE INVENTION

Examples of the present invention may provide a panel capable of detecting an input signal applied on or over the panel, the panel comprising an array of sensor elements divided into first $M_1$ groups arranged in rows and columns and second $M_1$ groups arranged in rows and columns, each group in one of the first and second $M_1$ groups including a number of M rows by N columns sensor elements, $M_1$, M and N being integers, wherein each of the sensor elements includes a first port and a second port, $M_1$ gate lines, wherein each of the $M_1$ gate lines is coupled to one group of the first $M_1$ groups and one group of the second $M_1$ groups, and wherein the each of the $M_1$ gate lines is coupled to the first port of each of the sensor elements in the one group of the first $M_1$ groups and the one group of the second $M_1$ groups, a first set of N fan-out lines, wherein each of the N fan-out lines is coupled to one column of the N columns of sensor elements in each of the groups at each of the columns of the first $M_1$ groups, and a second set of N fan-out lines, wherein each of the N fan-out lines is coupled to one column of the N columns of sensor elements in each of the groups at each of the columns of the second $M_1$ groups.

Some examples of the present invention may provide a panel capable of detecting an input signal applied on or over the panel, the panel comprising an array of sensor elements divided into $M_1$ groups arranged in rows and columns, each of the $M_1$ groups including a number of M rows by N columns sensor elements, $M_1$, M and N being integers, wherein each of the sensor elements includes a first port and a second port, $M_1$ gate lines configured to select one group from another in the $M_1$ groups row by row from one of the leftmost column and the rightmost column to the other one of the leftmost column and the rightmost column in one of an odd-numbered row and an even-numbered row in the $M_1$ groups, and from the other one of the leftmost column and the rightmost column to the one of the leftmost column and the rightmost column in the other one of the odd-numbered row and the even-numbered row in the $M_1$ groups, and a set of N fan-out lines, wherein each of the N fan-out lines is coupled to one of the N columns of sensor elements in each of the groups at each of the columns of the $M_1$ groups.

Examples of the present invention may also provide a panel capable of detecting an input signal applied on or over the panel, the panel comprising an array of sensor elements divided into $M_1$ groups arranged in rows and columns, each of the $M_1$ groups including a number of M rows by N columns sensor elements, $M_1$, M and N being integers, wherein each of the sensor elements includes a first port and a second port, $M_1$ gate lines configured to select one group from another in the $M_1$ groups row by row from one of the leftmost column and the rightmost column to the other one of the leftmost column and the rightmost column in each row of the $M_1$ groups, and a set of N fan-out lines, wherein each of the N fan-out lines is coupled to one of the N columns of sensor elements in each of the groups at each of the columns of the $M_1$ groups.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings.

DETAILED DESCRIPTION OF THE INVENTION

Reference will now be made in detail to the present examples of the invention, examples of which are illustrated in the accompanying drawings. Wherever possible, the same reference numbers will be used throughout the drawings to refer to the same or like parts.

Figure 1A:
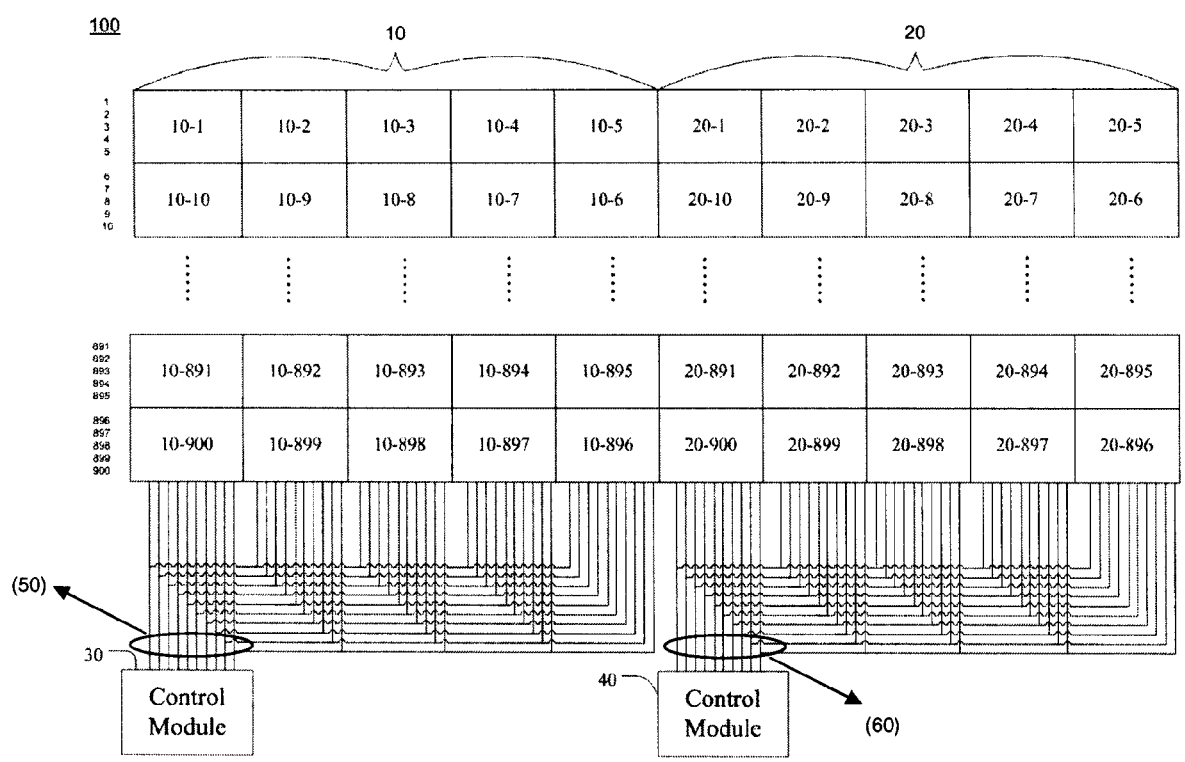
FIG. 1A is a diagram illustrating a panel according to an example of the present invention.

FIG. 1A is a diagram illustrating a panel 100 according to an example of the present invention. Referring to FIG. 1A, the panel 100 may support a resolution of, for example, 1200× 900 pixels or higher, depending on applications. The panel 100 may be formed with at least a first block 10 of sensor elements and a second block 20 of sensor elements. The first block 10 may further include a plurality of groups 10-1 to 10-900 of sensor elements, and the second block 20 may further include a plurality of groups 20-1 to 20-900 of sensor elements. Each of the sensor elements in the groups 10-1 to 10-900 and 20-1 to 20-900 may be configured to sense an input signal on or over the panel 100. Each of the groups 10-1 to 10-900 may include an array of 5 rows by 10 columns (5×10) sensor elements. The input signal may be generated by an optical source such as a stylus or a shadow of an object, or a pressure source such as a force applied through a pen or fingertip. Examples of the sensor elements may be found in but are not limited to commonly assigned applications, i.e., U.S. patent application Ser. No. 11/536,403, "Interactive Display Devices and Methods of Making the Same," filed Sep. 28, 2006, and U.S. patent application Ser. No. 11/777,887, "Photo Detector Array with Thin-Film Resistor-Capacitor Network," filed Jul. 13, 2007, which is a continuation-in-part of U.S. patent application Ser. No. 11/534,680, "Photo Detector Array," filed Sep. 25, 2006. Other sensor elements capable of supporting a touch panel based on a pressure source or a non-touch panel based on an optical source may also be applicable to the present invention. In one example, the panel 100 may include but is not limited to one of a photo-sensing panel, an organic light-emitting diode (OLED) panel and a low temperature poly silicon (LTPS) panel.

Figure 1B:
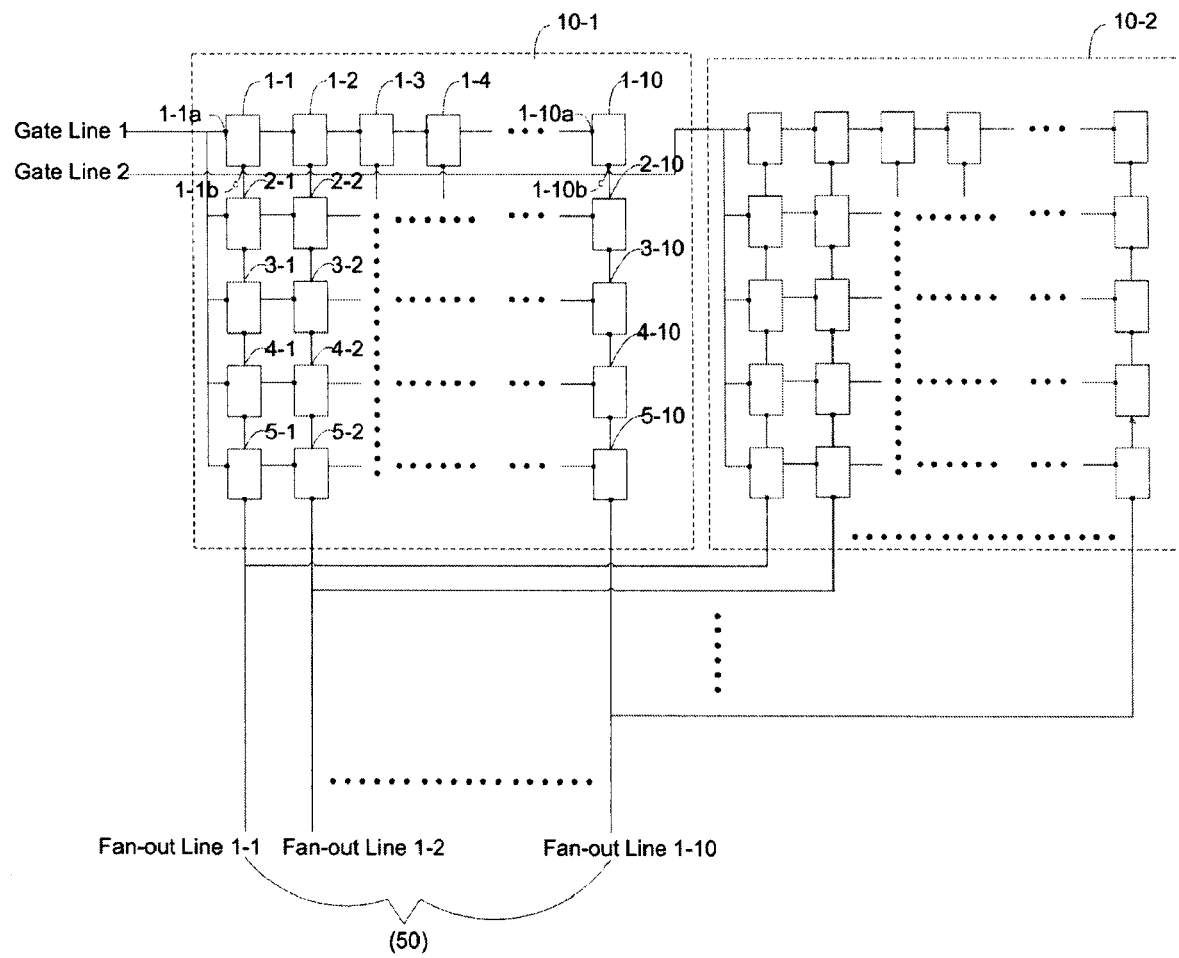
FIG. 1B is a diagram illustrating an array of sensor elements in a group of the panel illustrated in FIG. 1A.

FIG. 1B is a diagram illustrating an array of sensor elements 1-1 to 5-10 in the group 10-1 of the panel 100 illustrated in FIG. 1A. Referring to FIG. 1B, each of the sensor elements 1-1 to 5-10 in the group 10-1 may include a first port and a second port. Taking the sensor element 1-1 as an example, the sensor element 1-1 includes a first port 1-1a and a second port 1-1b. All the first ports of the sensor elements 1-1 to 5-10 may be coupled together with a first gate line 1 and driven by the first gate line 1. That is, the first gate line 1 is the gate line related to the group 10-1. Similarly, a second gate line 2 is the gate line related to the group 10-2. In the present example, the first gate line 1 is also the gate line related to the group 20-1, and the second gate line 2 is also the gate line related to the group 20-2. Similarly, the nine hundredth gate line 900 is the gate line related to the group 10-900 in the first block 10 and the group 20-900 in the second block 20.

Moreover, the second ports of each column of the sensor elements 1-1 to 5-10 may be coupled with one of fan-out lines 1-1 to 1-10. For example, the second ports of the first column of sensor elements 1-1, 2-1, 3-1, 4-1 and 5-1 may be coupled to a first fan-out line 1-1 of a first set 50 of fan-out lines, the second ports of the second column of sensor elements 1-2, 2-2, 3-2, 4-2 and 5-2 may be coupled to a second fan-out line 1-2 of the first set 50, and so forth. Similarly, also referring to FIG. 1A, the second ports of the first column of sensor elements in each of the groups 10-10 to 10-900 at the same column with the group 10-1 in the first block 10 may be coupled to the first fan-out line 1-1 of the first set 50 of fan-out-lines, the second ports of the second column of sensor elements in each of the groups 10-10 to 10-900 in the first block 10 may be coupled to the second fan-out line 1-2 of the first set 50, and so forth. Furthermore, the second ports of the first column of sensor elements in the group 10-2 in the first block 10 may be coupled to the first fan-out line 1-1 of the first set 50, the second ports of the second column of sensor elements in the group 10-2 may be coupled to the second fan-out line 1-2 of the first set 50, and so forth. Similarly, the second ports of the first column of sensor elements in each of the groups 10-9 to 10-899 at the same column with the group 10-2 in the first block 10 may be coupled to the first fan-out line 1-1 of the first set 50, the second ports of the second column of sensor elements in each of the groups 10-9 to 10-899 in the first block 10 may be coupled to the second fan-out line 1-2 of the first set 50, and so forth. Furthermore, the second ports of the first column of sensor elements in each of the groups 20-1, 20-10 to 20-900 at a first column of the second block 20 may be coupled to a first fan-out line of a second set 60 of fan-out lines, the second ports of the second column of sensor elements in each of the groups 20-1, 20-10 to 20-900 at the first column of the second block 20 may be coupled to a second fan-out line of the second set 60, and so forth. Similarly, the second ports of the first column of sensor elements in each of the groups 20-2, 20-9 to 20-899 at a second column of the second block 20 may be coupled to the first fan-out line of the second set 60, the second ports of the second column of sensor elements in each of the groups 20-2, 20-9 to 20-899 in the second block 20 may be coupled to the second fan-out line of the second set 60, and so forth. Accordingly, each of the first set 50 of N fan-out lines may be coupled to one column of the N columns of sensor elements in each of the groups at each of the columns of the first block 10 of groups. Furthermore, each of the second set 60 of N fan-out lines may be coupled to one column of the N columns of sensor elements in each of the groups at each of the columns of the second block 20 of groups.

Referring back to FIG. 1A, the panel 100 may include, for example, a total number of 900 gate lines, the first set 50 of fan-out lines for the first block 10 of the groups comprising the first five columns of groups 10-1 to 10-900 (first column), 10-2 to 10-899 (second column), 10-3 to 10-898 (third column), 10-4 to 10-897 (fourth column) and 10-5 to 10-896 (fifth column), and the second set 60 of fan-out lines for the second block 20 of the groups comprising the second five columns of groups 20-1 to 20-900 (sixth column), 20-2 to 20-899 (seventh column), 20-3 to 20-898 (eight column), 20-4 to 20-897 (ninth column) and 20-5 to 20-896 (tenth column). Specifically, the first set 50 of fan-out lines may include the 10 fan-out lines 1-1 to 1-10 described and illustrated with reference to FIG. 1B. As a result, the sensor elements in the present example may be grouped into a total number of 1,800 groups 10-1 to 10-900 and 20-1 to 20-900 respectively divided into the first block 10 and the second block 20. Moreover, the first port of each of sensor elements in one of the 1,800 groups may be driven by one of the 900 gate lines. For example, the group 10-1 in the first block 10 and the group 20-1 in the second block 20 may be coupled to and driven by the first gate line 1. Likewise, the group 10-2 in the first block 10 and the group 20-2 in the second block 20 may be coupled to and driven by the second gate line 2. Likewise, the group 10-6 in the first block 10 and the group 20-6 in the second block 20 may be coupled to and driven by a sixth gate line 6. Subsequently, the group 10-900 in the first block 10 and the group 20-900 in the second block 20 may be coupled to and driven by a nine hundredth gate line 900. Furthermore, the second ports of the sensor elements in each of the groups in the first block 10 and the second block 20 may be coupled with one fan-out-lined line of the first set 50 and the second set 60 of fan-out lines, respectively. Accordingly, an output signal including sensing information from the second port of each of the sensor elements in each of the groups may be collected by the one of the 10 fan-out lines at the same time.

In one example according to the present invention, the first set 50 of fan-out lines and the second set 60 of fan-out lines may be electrically coupled to a first control module 30 and a second control module 40, respectively. Since a gate line controller (not shown in FIG. 1A) may be configured to drive the 900 gate lines periodically in a first period, by using the gate lines to select one of the 900 groups in each of the first block 10 and the second block 20 in the first period, the first control module 30 and the second control module 40 may receive the output signals from the sensor elements related to a fan-out line of the sets of fan-outs 50 and 60, respectively.

In the present example, the gate line controller may drive the 900 gate lines in a first order, sequentially one by one, from the first gate line 1 to the nine hundredth gate line 900. Accordingly, the groups 10-1 and 20-1 related to the first gate line 1 may be selected when the first gate line 1 is selected. Next, the groups 10-2 and 20-2 related to the second gate line 2 may be selected when the second gate line 2 is selected. Likewise, the groups 10-6 and 20-6 related to the sixth gate line 6 may be selected when the sixth gate line 6 is selected. Subsequently, the groups 10-900 and 20-900 related to the nine hundredth gate line 900 may be selected when the nine hundredth gate line 900 is selected.

Figure 1C:
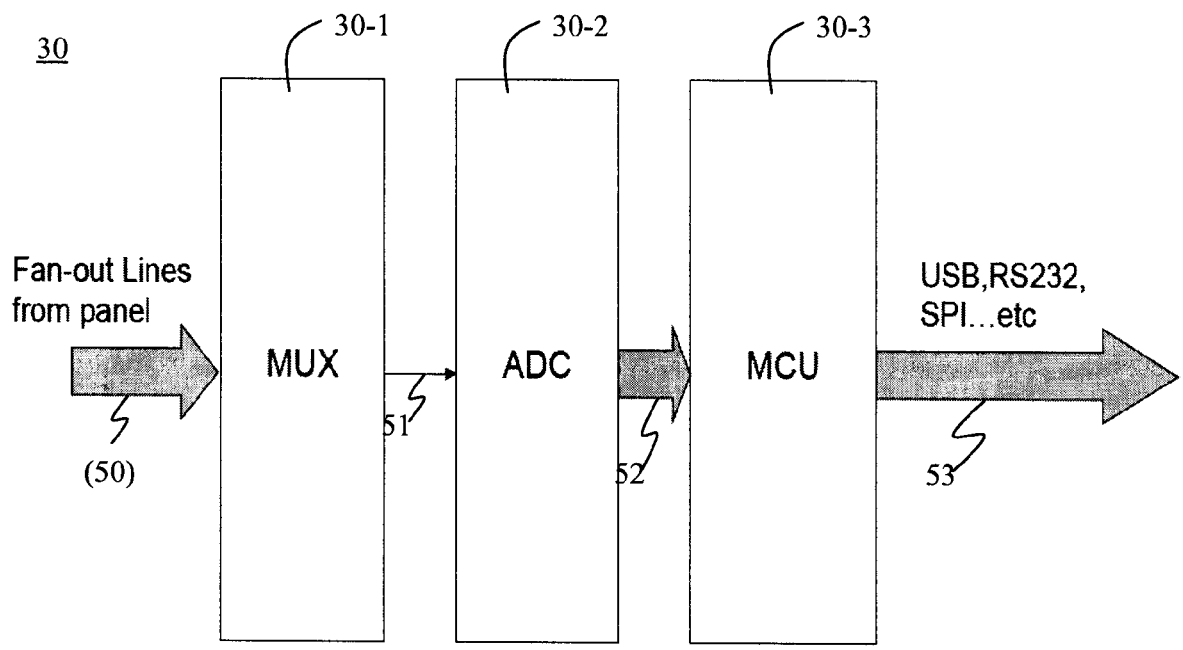
FIG. 1C is a block diagram of a control module illustrated in FIG. 1A.

FIG. 1C is a block diagram of the control module 30 illustrated in FIG. 1A. Referring to FIG. 1C, the control module 30 may include a multiplexer (MUX) 30-1, an analog-to-digital converter (ADC) 30-2 and a micro-control unit (MCU) 30-3. An output signal generated by a sensor element in a panel such as the panel 100 illustrated in FIG. 1A may be transferred through one of the first set 50 fan-out lines to the MUX 30-2. After multiplexing, a multiplexed signal 51 may be converted into a digital signal 52 at the ADC 30-2, and then be transferred to the MCU 30-3 for further processing.

Figure 2:
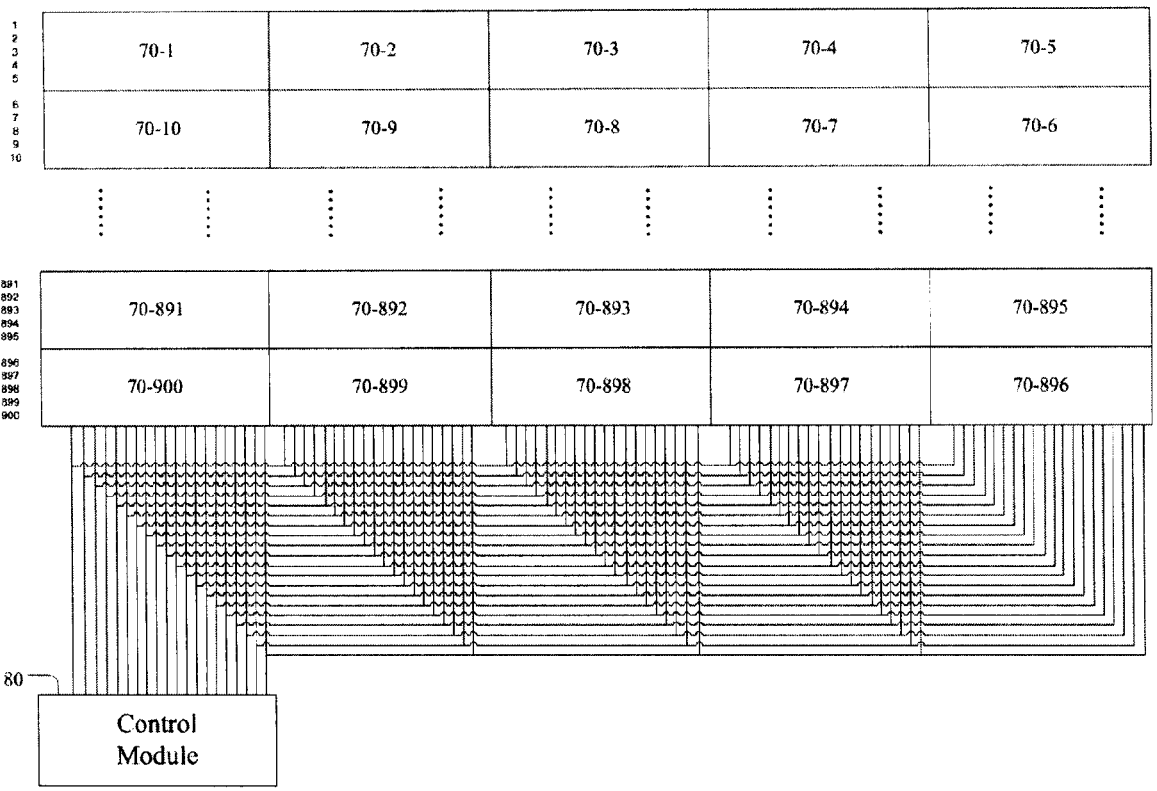
FIG. 2 is a diagram illustrating a panel according to another example of the present invention.

FIG. 2 is a diagram illustrating a panel 700 according to another example of the present invention. Referring to FIG. 2, the panel 700 may be similar to the panel 100 described and illustrated with reference to FIG. 1A except that, for example, each of the groups of sensor elements 70-1 to 70-900 may include an array of 5×20 sensor elements and only a set of fan-out lines including 20 fan-out lines and in turn only one control module 80 may be required. Specifically, a group 70-1 may be coupled to and driven by the first gate line 1, and a group 70-2 may be coupled to and driven by the second gate line 2. Likewise, a group 70-6 may be coupled to and driven by the sixth gate line 6, and subsequently, a group 70-900 may be coupled to and driven by the nine hundredth gate line 900. Furthermore, the group 70-1 related to the first gate line 1 may be selected when the first gate line 1 is selected. Next, the group 70-2 related to the second gate line 2 may be selected when the second gate line 2 is selected. Likewise, the group 70-6 related to the sixth gate line 6 may be selected when the sixth gate line 6 is selected. Subsequently, the group 70-900 related to the nine hundredth gate line 900 may be selected when the nine hundredth gate line 900 is selected. Accordingly, the groups 70-1 to 70-900 may be selected row by row in a top-down manner. For odd-numbered rows, the groups are selected from the left-most column to the right-most column. For even-numbered rows, however, the groups are selected from the right-most column to the left-most column.

Figure 3:
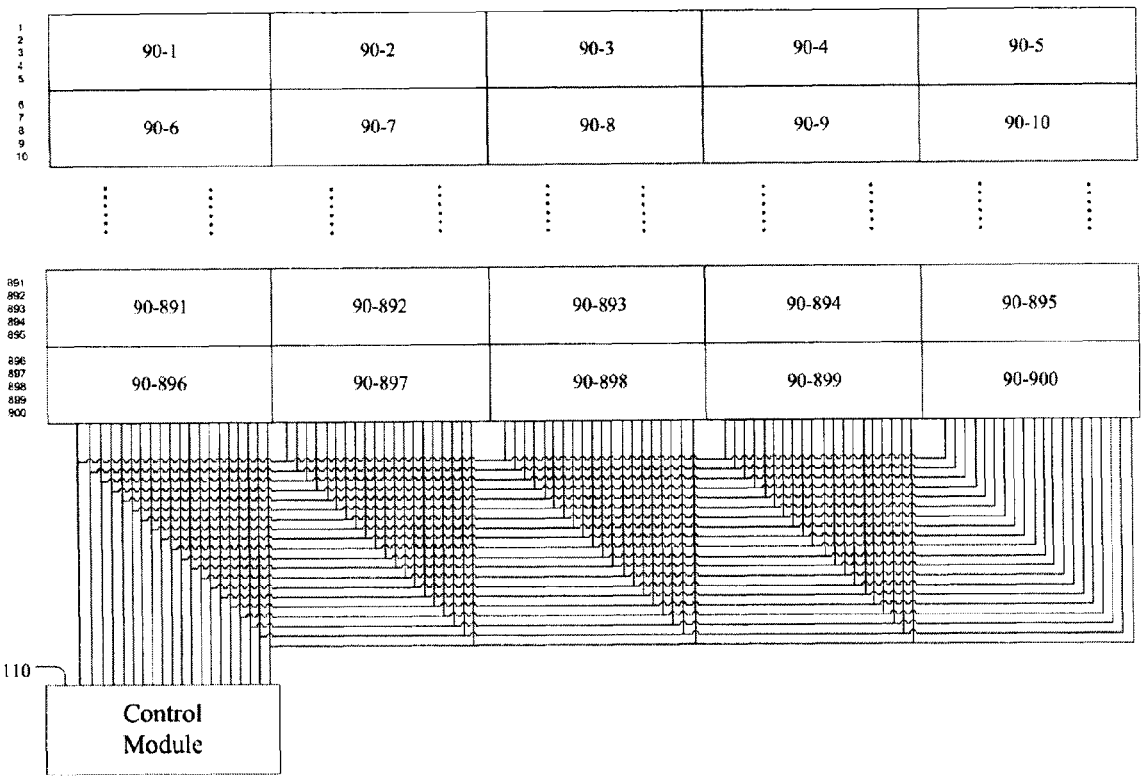
FIG. 3 is a diagram illustrating a panel according to still another example of the present invention.

FIG. 3 is a diagram illustrating a panel 900 according to still another example of the present invention. Referring to FIG. 3, the panel 900 may be similar to the panel 700 described and illustrated with reference to FIG. 2 except that, for example, groups 90-1 to 90-900 of the panel 900 may be selected row by row in a top-down manner from the left-most column to the right-most column in each of the rows of groups.

Figure 4:
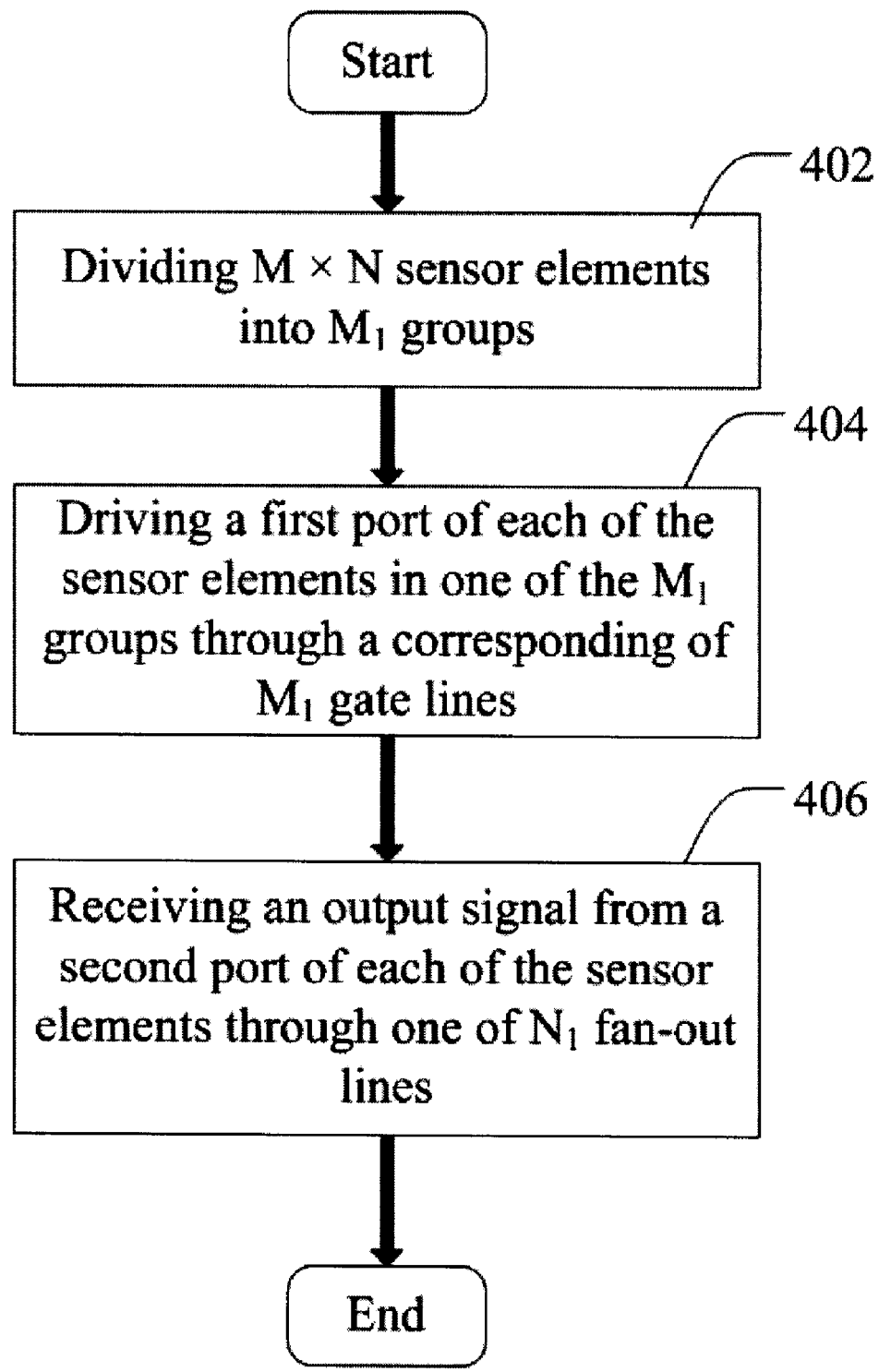
FIG. 4 is a diagram illustrating a method for controlling sensor elements of a panel according to an example of the present invention.

FIG. 4 is a diagram illustrating a method for controlling sensor elements of a panel according to an example of the present invention. Referring to FIG. 4, the panel may include an array of groups, each of which includes an array of sensor elements. Each of the sensor elements may include a first port and a second port. At step 402, the array of groups may be divided into $M_1$ groups, each of the groups including an array of M×N sensor elements, $M_1$, M and N being positive integers, wherein $M_1$ is the number of gate lines. Next at step 404, the first port of each of the sensor elements in one of the $M_1$ groups may be driven through a corresponding of the $M_1$ gate lines. Then at step 406, a control module may receive an output signal from the second port of each of the sensor elements through one of $N_1$ fan-out lines, wherein $N_1$ is the number of columns of sensor elements in each of the $M_1$ groups. In one example, more than one control modules may be provided and each of the control modules may be configured to support $M_1$ groups of sensor elements. In another example, the groups of sensor elements may be selected one group after another row by row in a top-town manner in the $M_1$ groups, wherein in odd-numbered rows of the $M_1$ groups the groups are selected from the leftmost column to the rightmost column, and in even-numbered rows of the $M_1$ groups the groups are selected from the rightmost column to the leftmost column. In still another example, the groups of sensor elements may be selected one group after another row by row in a top-down manner in the $M_1$ groups from the leftmost column to the rightmost column in each of the rows of the $M_1$ groups. In yet another example, the groups of sensor elements may be selected one group after another row by row in a top-down manner in the $M_1$ groups from the rightmost column to the leftmost column in each of the rows of the $M_1$ groups. In yet still another example, the groups of sensor elements may be selected one group after another row by row in a down-top or bottom-top manner in the $M_1$ groups.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. A panel capable of detecting an input signal applied on or over the panel, the panel comprising:
   an array of sensor elements divided into first $M_1$ groups arranged in rows and columns and second $M_1$ groups arranged in rows and columns, each group in one of the first and second $M_1$ groups including a number of M rows by N columns adjacent sensor elements, $M_1$, M and N being integers greater than one, wherein each of the sensor elements includes a first port and a second port;
   $M_1$ gate lines, wherein each of the $M_1$ gate lines is coupled to one different group of the first $M_1$ groups and to one different group of the second $M_1$ groups, and wherein the each of the $M_1$ gate lines is coupled to the first port of each of the sensor elements in the one group of the first $M_1$ groups and the one group of the second $M_1$ groups;
   a first set of N fan-out lines, wherein each of the N fan-out lines is coupled to one column of the N columns of sensor elements in each of the groups at each of the columns of the first $M_1$ groups; and a second set of N fan-out lines, wherein each of the N fan-out lines is coupled to one column of the N columns of sensor elements in each of the groups at each of the columns of the second $M_1$ groups.

2. The panel of claim 1, wherein the $M_1$ gate lines are configured to select one group after another in one of the first and second $M_1$ groups row by row in one of a top-down manner and a bottom-top manner.

3. The panel of claim 2, wherein the $M_1$ gate lines are configured to select from the leftmost column to the rightmost column in one of an odd-numbered row and an even-numbered row.

4. The panel of claim 3, wherein the $M_1$ gate lines are configured to select from the rightmost column to the leftmost column in the other one of the odd-numbered row and the even-numbered row.

5. The panel of claim 2, wherein the $M_1$ gate lines are configured to select from the leftmost column to the rightmost column in each of the rows of one of the first and second $M_1$ groups.

6. The panel of claim 2, wherein the $M_1$ gate lines are configured to select from the rightmost column to the leftmost column in each of the rows of one of the first and second $M_1$ groups.

7. The panel of claim 1 further comprising a first control module coupled to the first set of N fan-out lines.

8. The panel of claim 1 further comprising a second control module coupled to the second set of N fan-out lines.

9. The panel of claim 1 further comprising an array of sensor elements in third $M_1$ groups, wherein each of the third $M_1$ groups includes a number of M rows by 2N columns sensor elements.

10. The panel of claim 9 further comprising a third control module coupled to the third $M_1$ groups.

11. A panel capable of detecting an input signal applied on or over the panel, the panel comprising:
 an array of sensor elements divided into $M_1$ groups arranged in rows and columns, each of the $M_1$ groups including a number of M rows by N columns adjacent sensor elements, $M_1$, M and N being integers greater than one, wherein each of the sensor elements includes a first port and a second port;
 $M_1$ gate lines configured to select one group after another in the $M_1$ groups row by row from one of the leftmost column and the rightmost column to the other one of the leftmost column and the rightmost column in one of an odd-numbered row and an even-numbered row in the $M_1$ groups, and from the other one of the leftmost column and the rightmost column to the one of the leftmost column and the rightmost column in the other one of the odd-numbered row and the even-numbered row in the $M_1$ groups; and
 a set of N fan-out lines, wherein each of the N fan-out lines is coupled to one of the N columns of sensor elements in each of the groups at each of the columns of the $M_1$ groups.

12. The panel of claim 11, wherein each of the $M_1$ gate lines is coupled to one group of the $M_1$ groups, and wherein the each of the $M_1$ gate lines is coupled to the first port of each of the sensor elements in the one group of the $M_1$ groups.

13. The panel of claim 11, wherein the $M_1$ gate lines are configured to select one group after another in the $M_1$ groups row by row in a top-down manner.

14. The panel of claim 11, wherein M gate lines of the $M_1$ gate lines are configured to select a row of groups in the $M_1$ groups.

15. The panel of claim 11, wherein the $M_1$ gate lines are configured to select one group after another in the $M_1$ groups row by row in a bottom-top manner.

16. The panel of claim 11 further comprising a control module coupled to the set of N fan-out lines.

17. A panel capable of detecting an input signal applied on or over the panel, the panel comprising:
 an array of sensor elements divided into $M_1$ groups arranged in rows and columns, each of the $M_1$ groups including a number of M rows by N columns adjacent sensor elements, $M_1$, M and N being integers greater than one, wherein each of the sensor elements includes a first port and a second port;
 $M_1$ gate lines configured to select one group after another in the $M_1$ groups row by row from one of the leftmost column and the rightmost column to the other one of the leftmost column and the rightmost column in each row of the $M_1$ groups; and
 a set of N fan-out lines, wherein each of the N fan-out lines is coupled to one of the N columns of sensor elements in each of the groups at each of the columns of the $M_1$ groups.

18. The panel of claim 17, wherein each of the $M_1$ gate lines is coupled to one group of the $M_1$ groups, and wherein the each of the $M_1$ gate lines is coupled to the first port of each of the sensor elements in the one group of the $M_1$ groups.

19. The panel of claim 17, wherein the $M_1$ gate lines are configured to select one group after another in the $M_1$ groups row by row in one of a top-down and bottom-top manner.

20. The panel of claim 17 further comprising a control module coupled to the set of N fan-out lines.

* * * * *